(12) United States Patent
Nagamori et al.

(10) Patent No.: US 10,256,475 B2
(45) Date of Patent: Apr. 9, 2019

(54) ELECTRODE CATALYST, COMPOSITION FOR FORMING GAS DIFFUSION ELECTRODE, GAS DIFFUSION ELECTRODE, MEMBRANE-ELECTRODE ASSEMBLY, AND FUEL CELL STACK

(71) Applicant: N.E. CHEMCAT Corporation, Tokyo (JP)

(72) Inventors: Kiyotaka Nagamori, Bando (JP); Tomoteru Mizusaki, Bando (JP); Yoko Nakamura, Bando (JP); Takuya Tsubaki, Bando (JP); Hiroshi Igarashi, Bando (JP); Yasuhiro Seki, Bando (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

(21) Appl. No.: 15/648,015

(22) Filed: Jul. 12, 2017

(65) Prior Publication Data

US 2017/0331118 A1    Nov. 16, 2017

Related U.S. Application Data

(63) Continuation of application No. 15/023,213, filed as application No. PCT/JP2015/059810 on Mar. 27, 2015, now abandoned.

(30) Foreign Application Priority Data

Mar. 28, 2014  (JP) ................................ 2014-070626

(51) Int. Cl.
*H01M 4/86* (2006.01)
*H01M 4/90* (2006.01)
(Continued)

(52) U.S. Cl.
CPC ............ *H01M 4/8657* (2013.01); *H01M 4/86* (2013.01); *H01M 4/8605* (2013.01); *H01M 4/90* (2013.01);
(Continued)

(58) Field of Classification Search
CPC ...... H01M 4/8657; H01M 4/92; H01M 4/9041
See application file for complete search history.

(56) References Cited

U.S. PATENT DOCUMENTS 10,115,992 B2 * 10/2018 Nagamori ................ B01J 23/44
2006/0042957 A1   3/2006 He
(Continued)

FOREIGN PATENT DOCUMENTS

CA    2911438 A1    11/2014
EP    2995378 A1    3/2016
(Continued)

OTHER PUBLICATIONS

Office action dated Jun. 21, 2017 during the prosecution of corresponding European patent application No. 15768953.0.
(Continued)

*Primary Examiner* — Jeremiah R Smith
(74) *Attorney, Agent, or Firm* — Troutman Sanders LLP

(57) ABSTRACT

Provided is an electrode catalyst that can exhibit sufficient performance, is suitable for mass production, and is suitable for reducing production costs, even when containing a relatively high concentration of chlorine. The electrode catalyst has a core-shell structure including a support; a core part that is formed on the support; and a shell part that is formed so as to cover at least one portion of the surface of the core part. A concentration of bromine (Br) species of the electrode catalyst as measured by X-ray fluorescence (XRF) spectroscopy is 500 ppm or less, and a concentration of chlorine (Cl) species of the electrode catalyst as measured
(Continued)

by X-ray fluorescence (XRF) spectroscopy is 8,500 ppm or less.

20 Claims, 4 Drawing Sheets

(51) Int. Cl.
*H01M 4/92* (2006.01)
*H01M 8/1004* (2016.01)
*H01M 8/1018* (2016.01)

(52) U.S. Cl.
CPC ............. *H01M 4/92* (2013.01); *H01M 4/926* (2013.01); *H01M 8/1004* (2013.01); *H01M 4/9041* (2013.01); *H01M 2008/1095* (2013.01)

(56) References Cited

U.S. PATENT DOCUMENTS

| | | | |
|---|---|---|---|
| 2014/0171290 A1* | 6/2014 | Lopez ................... | B01J 23/892 502/1 |
| 2016/0126560 A1* | 5/2016 | Maruyama .......... | H01M 4/8657 429/523 |
| 2016/0233517 A1 | 8/2016 | Nagamori et al. | |

FOREIGN PATENT DOCUMENTS

| | | |
|---|---|---|
| EP | 3035425 A1 | 6/2016 |
| JP | S52-041738 | 3/1977 |
| JP | 2002249488 A | 9/2002 |
| JP | 2003129102 A | 5/2003 |
| JP | 2008511534 A | 4/2008 |
| JP | 2008126211 A | 6/2008 |
| JP | 0004286499 B2 | 7/2009 |
| JP | 2010214330 A | 9/2010 |
| JP | 2011003492 A | 1/2011 |
| JP | 2011218278 A | 11/2011 |
| JP | 2014239033 A | 12/2014 |
| WO | 2006026144 A1 | 3/2006 |
| WO | 2011115012 A1 | 9/2011 |
| WO | 2014181873 A1 | 11/2014 |
| WO | 2015147308 A1 | 10/2015 |

OTHER PUBLICATIONS

Office action dated Aug. 10, 2017 during the prosecution of corresponding Canadian patent application No. 2,924,306.
Matsuoka et al., "Degradation of Polymer Electrolyte Fuel Cells under the Existence of Anion Species", J. Power Sources, May 1, 2008, vol. 179 No. 2, p. 560-565.
Canadian Office Action dated Jul. 4, 2016 issued in corresponding Canadian Patent Application No. 2,924,306.
Extended European Search Report dated Aug. 25, 2016 issued in corresponding European Patent Application No. 15768953.0.
Zhang, et al., "Pd@Pt Core?Shell Nanostructures with Controllable Composition Synthesized by a Microwave Method and Their Enhanced Electrocatalytic Activity toward Oxygen Reduction and Methanol Oxidation", J. Phys. Chem. C, 2010, 114 (27), pp. 11861-11867.
Simone, et al., "Reversible Poisoning of Palladium Catalysts for Methane Oxidation Article in Applied Catalysis", 70 (1):87-100, Dec. 1991.
Korean Office Action dated Jul. 15, 2016 issued in corresponding Korean Patent Application No. 2016-7007187.
PCT International Search Report dated Jun. 23, 2015 issued in corresponding PCT International Application No. PCT/JP2015/059810.

\* cited by examiner

ELECTRODE CATALYST, COMPOSITION FOR FORMING GAS DIFFUSION ELECTRODE, GAS DIFFUSION ELECTRODE, MEMBRANE-ELECTRODE ASSEMBLY, AND FUEL CELL STACK

CROSS-REFERENCE TO RELATED APPLICATIONS

This application is continuation of U.S. patent application Ser. No. 15/023,213, filed Mar. 18, 2016, which is a U.S. National Stage of International Application No. PCT/JP2015/059810, filed Mar. 27, 2015, which claims the benefit of Japanese Patent Application No. 2014-070626, filed Mar. 28, 2014, the entire contents of each of which are hereby incorporated by reference.

TECHNICAL FIELD

The present invention relates to an electrode catalyst. Also, the present invention relates to a composition for forming a gas diffusion electrode including the electrode catalyst, a gas diffusion electrode, a membrane-electrode assembly, and a fuel cell stack.

BACKGROUND

A so-called polymer electrolyte fuel cell (Polymer Electrolyte Fuel Cell: hereinafter called "PEFC" as needed), has its operating temperature of from a room temperature to about 80° C. Also, since PEFC makes it possible to employ inexpensive general-purpose plastics, etc. for members constituting its fuel cell body, it is possible to realize reduction in weight. Furthermore, PEFC makes it possible to achieve thinning of a polymer electrolyte membrane, enabling an electric resistance to be reduced, thereby enabling a power loss to be reduced relatively easily. Due to PEFC having not a few advantages as described above, it is applicable to a fuel cell vehicle, a home cogeneration system, and the like.

As an electrode catalyst for PEFC, there has been proposed an electrode catalyst in which a platinum (Pt) or platinum (Pt) alloy, i.e., a component for the electrode catalyst, is supported on a carbon serving as a support (for example, MATSUOKA et al., "Degradation of Polymer Electrolyte fuel cells under the existence of anion species", J. Power Sources, 2008.05.01, Vol. 179 No. 2, P. 560-565).

Conventionally, there have been disclosed that, as for an electrode catalyst for PEFC, if the content of chlorine contained in the electrode catalyst is 100 ppm or more, it is not desirable as an electrode catalyst (for example, Japanese Un-examined Patent Application Publication No. 2003-129102 (Japanese Patent No. 4,286,499)); and that this is because if the content of chlorine contained in the electrode catalyst is 100 ppm or more, it is impossible to obtain a sufficient catalytic activity for the electrode catalyst for fuel cells; and corrosion of its catalyst layer will occur, thus shortening the life of the fuel cell.

Then, there is disclosed, as the catalyst component of the electrode catalyst, a powder of platinum (Pt) or platinum (Pt) alloy that contains less than 100 ppm of chlorine (for example, Japanese Un-examined Patent Application Publication No. 2003-129102 (Japanese Patent No. 4,286,499)).

As for the preparation of a powder of the platinum (Pt) or platinum (Pt) alloy, there is disclosed the following method: forming a melt which contains a low-melting mixture of alkali-metal nitrate, a chlorine-free platinum compound and a chlorine-free compound of alloying elements; heating the melt up to a reaction temperature at which the platinum compound and the compound of the alloying elements are thermally decomposed to give an oxide; cooling the melt; and the melt is dissolved in water and the resulting oxide or mixed oxides are converted into a powder of platinum or platinum alloy by successive reduction.

Incidentally, the present applicant submits, as publications where the above-mentioned publicly-known inventions are described, the following publications:

SUMMARY

As mentioned above, from the viewpoint of improving the catalytic activity and lifetime of PEFC as the electrode catalyst, it is important to reduce the content of chlorine contained in the catalyst.

However, from the viewpoint of seeking to simplify the manufacturing process and reduce the manufacturing cost for the practical use of PEFC, there has been room for improvement in the conventional arts described above.

That is, according to the aforementioned electrode catalyst having a chlorine content of less than 100 ppm, there has been a need to prepare the same through a complex process for removing chlorine as disclosed in Patent Document 2, etc., and hence there has been room for improvement.

Thus, when assuming a future mass production of PEFC, it is considered that there will be required an electrode catalyst that can demonstrate a sufficient performance even when having a relatively high chlorine concentration as high as more than 100 ppm, and can be prepared without a special and complicated process for eliminating chlorine such that the electrode catalyst is suitable for mass production and reducing the manufacturing cost.

The present invention has been made in view of such technical circumstances, and it is an object of the present invention to provide an electrode catalyst that can exhibit sufficient catalytic performance even when it contains a relatively high chlorine concentration as high as more than 100 ppm.

Also, it is another object of the present invention to provide an electrode catalyst that it is suitable for mass production due to the fact that there is required no special and complicated process for eliminating chlorine, and is also suitable for reducing the manufacturing cost.

Furthermore, it is a further object of the present invention to provide a composition for forming a gas diffusion electrode, a gas diffusion electrode, a membrane-electrode assembly (MEA), and a fuel cell stack that include the aforementioned electrode catalyst.

The present inventors, as a result of having performed intensive studies, found out that it is possible to produce an electrode catalyst which still exhibits a satisfactory performance (a core-shell catalyst to be described later), even when containing such a high concentration of chlorine as high as more than 100 ppm, by reducing the concentration of bromine (Br) species contained in the electrode catalyst as measured by X-ray fluorescence (XRF), and have completed the present invention.

More specifically, the present invention comprises the following technical matters:

That is, the present invention (1) provides an electrode catalyst having a core-shell structure comprising:
   a support;
   a core part formed on said support; and
   a shell part formed to cover at least a part of a surface of
     said core part, wherein the concentration of bromine (Br) species is not higher than 500 ppm when measured by X-ray fluorescence (XRF) spectroscopy, and the concentration of chlorine (Cl) species is not higher than 8,500 ppm when measured by X-ray fluorescence (XRF) spectroscopy.

Even when the concentration of chlorine (Cl) species contained in the catalyst is extremely high as 8,500 ppm, the electrode catalyst of the present invention can exhibit a sufficient catalytic activity as an electrode catalyst by controlling the concentration of the bromine (Br) species to 500 ppm or less. Further, the electrode catalyst is suitable for mass production in that it does not require a special and complex manufacturing process of removing chlorine, and is thus suitable for reducing the manufacturing cost.

In the present invention, a bromine (Br) species, refers to a chemical species containing bromine as a constituent element. Specifically, the chemical species containing bromine include bromine atom (Br), bromine molecule ($Br_2$), bromide ion (Br–), bromine radical (Br.), polyatomic bromine ion and a bromine compound (e.g. X—Br where X represents a counterion).

In the present invention, the chlorine (Cl) species refers to a chemical species containing chlorine as a constituent element. Specifically, the chemical species containing chlorine include chlorine atom (Cl), chlorine molecule ($Cl_2$), chloride ion ($Cl^-$), chlorine radical (Cl.), polyatomic chloride ion and a chlorine compound (e.g. X—Cl where X represents a counterion).

In the present invention, bromine (Br) species concentration and chlorine (Cl) species concentration are measured by X-ray fluorescence (XRF) spectrometry. A value of the bromine (Br) species contained in the electrode catalyst that is measured by X-ray fluorescence (XRF) spectrometry is the concentration of bromine (Br) species. Likewise, A value of the chlorine (Cl) species contained in the electrode catalyst that is measured by X-ray fluorescence (XRF) spectrometry is the concentration of chlorine (Cl) species.

Here, the bromine (Br) species concentration and chlorine (Cl) species concentration are concentrations of the bromine atoms and chlorine atoms in terms of the bromine element and chlorine element that are respectively contained in the electrode catalyst.

Further, the present invention provides (2) the electrode catalyst as set forth in (1), in which the concentration of chlorine (Cl) species is not lower than 900 ppm.

In this way, the effects of the present invention can be achieved more reliably.

Furthermore, the present invention provides (3) the electrode catalyst as set forth in (1) or (2), in which the shell part contains at least one metal selected from platinum (Pt) and a platinum (Pt) alloy, and the core part contains at least one metal selected from the group consisting of palladium (Pd), a palladium (Pd) alloy, a platinum (Pt) alloy, gold (Au), nickel (Ni) and a nickel (Ni) alloy.

In this way, the effects of the present invention can be achieved more reliably. Further, by employing the abovementioned structure, there can be achieved a higher catalytic activity and a higher durability.

Furthermore, the present invention provides (4) the electrode catalyst as set forth in (3), in which the support contains an electrically conductive carbon, the shell part contains platinum (Pt) and the core part contains palladium (Pd).

In this way, the effects of the present invention can be achieved more reliably. Further, by employing the above-mentioned structure, there can be achieved a higher catalytic activity and a higher durability. Furthermore, by employing the abovementioned structure, the electrode catalyst of the present invention, as compared to a conventional electrode catalyst having a structure where platinum is supported on a carbon support, is capable of reducing the amount of platinum contained and is thus capable of easily reducing a raw material cost.

Furthermore, the present invention provides (5) the electrode catalyst as set forth in (1) or (2), in which the shell part has: a first shell part formed to cover at least a part of the surface of the core part; and a second shell part formed to cover at least a part of a surface of the first shell part.

In this way, the effects of the present invention can be achieved more reliably. By employing the abovementioned structure, the electrode catalyst of the present invention is capable of reducing the contained amount of a noble metal(s) such as platinum used in the core part, and is thus capable of easily reducing a raw material cost.

Furthermore, the present invention provides (6) the electrode catalyst as set forth in (5), in which the first shell part contains palladium (Pd), and the second shell part contains platinum (Pt).

In this way, the effects of the present invention can be achieved more reliably. Further, by employing the abovementioned structure, there can be achieved a higher catalytic activity and a higher durability.

Furthermore, the present invention provides (7) a composition for forming a gas diffusion electrode, containing the electrode catalyst as set forth in any one of (1) to (6).

According to the gas diffusion electrode-forming composition of the present invention, it is possible to easily produce a gas diffusion electrode with a high catalytic activity (polarization property) because it contains the electrode catalyst of the present invention.

Furthermore, the present invention provides (8) a gas diffusion electrode containing the electrode catalyst as set forth in any one of (1) to (6).

According to the gas diffusion electrode of the present invention, it is possible to achieve a high catalytic activity (polarization property) because it contains the electrode catalyst of the present invention.

Furthermore, the present invention provides (9) a membrane-electrode assembly (MEA) including the gas diffusion electrode as set forth in (8).

According to the membrane-electrode assembly (MEA) of the present invention, it is possible to achieve a high battery property because it contains the gas diffusion electrode of the present invention.

Furthermore, the present invention provides

(10) a fuel cell stack including the membrane-electrode assembly (MEA) as set forth in (9).

According to the fuel cell stack of the present invention, it is possible to achieve a high battery property because it contains the membrane-electrode assembly (MEA) of the present invention.

According to the present invention, there can be provided an electrode catalyst that can exhibit a sufficient catalytic performance even when containing a relatively high concentration of chlorine as high as more than 100 ppm, Also, according to the present invention, there can be provided an electrode catalyst that is suitable for mass production due to not getting through the particular, complicated process for removal of chlorine and is also suitable for reduction of the manufacturing cost.

Further, according to the present invention, there can be provided a composition for forming a gas diffusion electrode, a gas diffusion electrode, a membrane-electrode assembly (MEA), and a fuel cell stack that include the aforementioned electrode catalyst.

DETAILED DESCRIPTION

Preferable embodiments of the present invention are described in detail hereunder with reference to the drawings when necessary.

Figure 1:
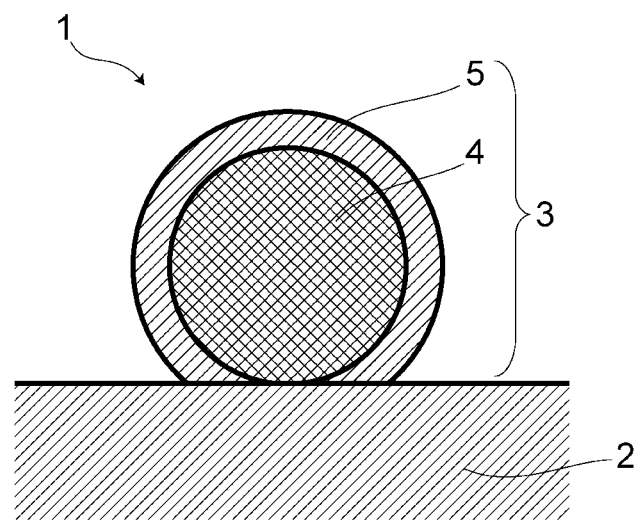
FIG. 1 is a schematic sectional view showing a preferred embodiment of the electrode catalyst of the present invention (core-shell catalyst).

FIG. 1 is a schematic cross-sectional view showing a preferable embodiment of an electrode catalyst (core-shell catalyst) of the present invention.

As shown in FIG. 1, an electrode catalyst 1 of the present invention includes a support 2; and catalyst particles 3 supported on the support 2 and having a so-called "core-shell structure." Each catalyst particle 3 has a core part 4; and a shell part 5 covering at least a part of the surface of the core part 4. The catalyst particles 3 thus have a so-called "core-shell structure" including the core part 4 and the shell part 5 formed on the core part 4.

That is, the electrode catalyst 1 has the catalyst particles 3 supported on the support 2, and the catalyst particles 3 have the structure where the core part 4 serves as a core (core portion), and the shell part 5 as a shell covers at least a part of the surface of the core part 4.

Further, the constituent element (chemical composition) of the core part 4 and the constituent element (chemical composition) of the shell part 5 differ from each other in composition.

There are no particular restrictions on the electrode catalyst 1 of the present invention except that the shell part 5 has to be formed on at least a part of the surface of the core part 4 of each catalyst particle 3.

For example, in terms of more reliably achieving the effects of the present invention, it is preferred that the electrode catalyst 1 be in a state where the whole range of the surface of the core part 4 is substantially covered by the shell part 5, as shown in FIG. 1.

Further, the electrode catalyst 1 may also be in a state where a part of the surface of the core part 4 is covered by the shell part 5, and the rest part of the surface of the core part 4 is thus partially exposed, provided that the effects of the present invention can be achieved.

That is, with regard to the electrode catalyst of the present invention, it is sufficient that the shell part be formed on at least a part of the surface of the core part.

Figure 2:
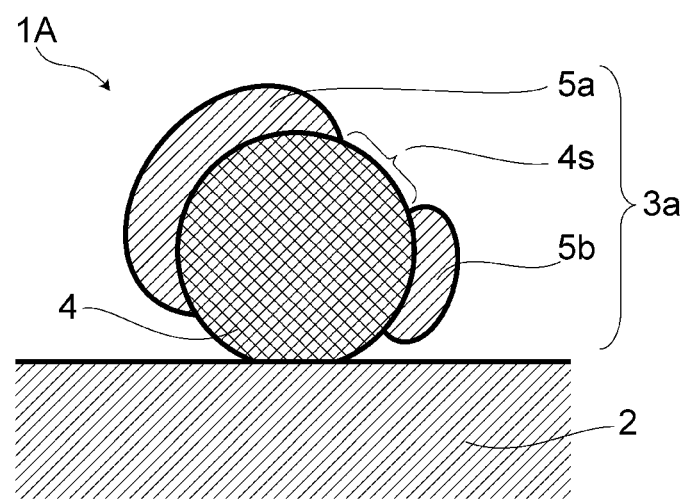
FIG. 2 is a schematic sectional view showing another preferred embodiment of the electrode catalyst of the present invention (core-shell catalyst).

FIG. 2 is a schematic cross-sectional view showing an other preferable embodiment (electrode catalyst 1A) of the electrode catalyst (core-shell catalyst) of the present invention.

As shown in FIG. 2, an electrode catalyst 1A of the present invention has catalyst particles 3a each being composed of a core part 4; a shell part 5a covering a part of the surface of the core part 4; and a shell part 5b covering an other part of the surface of the core part 4.

With regard to the catalyst particles 3a contained in the electrode catalyst 1A shown in FIG. 2, there is a part of the core part 4 that is neither covered by the shell part 5a nor covered by the shell part 5b. This part of the core part 4 composes a core part-exposed surface 4s.

That is, as shown in FIG. 2, the catalyst particles 3a contained in the electrode catalyst 1A may also be in a state where the surface of the core part 4 is partially exposed (e.g. a state where 4s as a part of the surface of the core part 4 shown in FIG. 2 is exposed).

In other words, as is the case with the electrode catalyst 1A shown in FIG. 2, the shell part 5a may be partially formed on a part of the surface of the core part 4, and the shell part 5b may then be partially formed on an other part of the surface of the core part 4.

Figure 3:
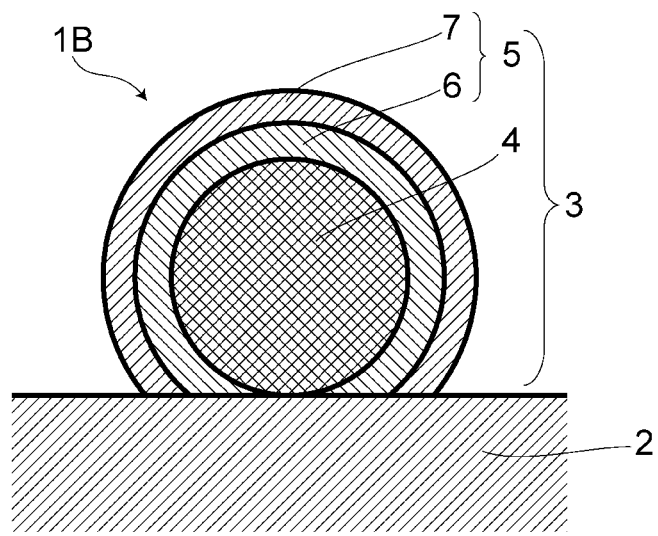
FIG. 3 is a schematic sectional view showing another preferred embodiment of the electrode catalyst of the present invention (core-shell catalyst).

FIG. 3 is a schematic cross-sectional view showing an other preferable embodiment (electrode catalyst 1B) of the electrode catalyst (core-shell catalyst) of the present invention.

As shown in FIG. 3, an electrode catalyst 1B of the present invention has catalyst particles 3 each being composed of a core part 4; and a shell part 5 substantially covering the whole range of the surface of the core part 4.

The shell part 5 may have a two-layered structure composed of a first shell part 6 and a second shell part 7. That is, the catalyst particles 3 have a so-called "core-shell structure" comprised of the core part 4; and the shell part 5 (first shell part 6 and second shell part 7) formed on the core part 4.

The electrode catalyst 1B has a structure where the catalyst particles 3 are supported on the support 2; the core part 4 of each catalyst particle 3 serves as a core (core portion); and the whole range of the surface of the core part 4 is substantially covered by the shell part 5 composed of the first shell part 6 and the second shell part 7.

Here, the constituent element (chemical composition) of the core part 4, the constituent element (chemical composition) of the first shell part 6 and the constituent element (chemical composition) of the second shell part 7 differ from one another in composition.

Moreover, the shell part 5 included in the electrode catalyst 1B of the present invention may further include an other shell part in addition to the first shell part 6 and the second shell part 7.

In terms of more reliably achieving the effects of the present invention, it is preferred that the electrode catalyst 1B be in a state where the whole range of the surface of the core part 4 is substantially covered by the shell part 5, as shown in FIG. 3.

Figure 4:
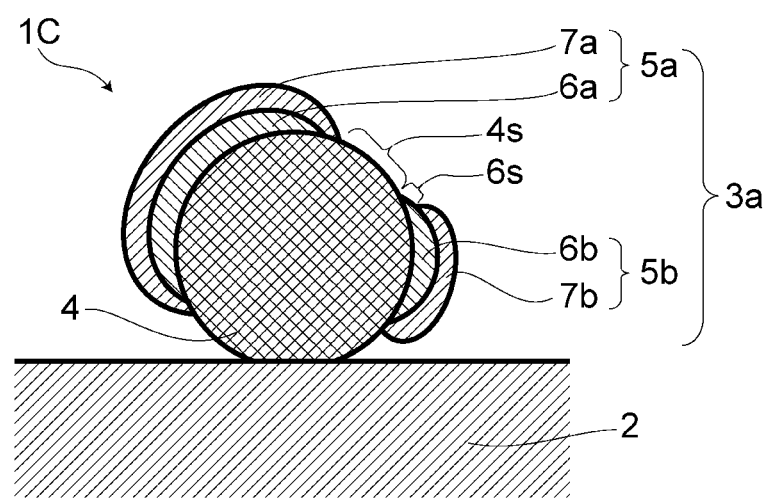
FIG. 4 is a schematic sectional view showing another preferred embodiment of the electrode catalyst of the present invention (core-shell catalyst).

FIG. 4 is a schematic cross-sectional view showing an other preferable embodiment (electrode catalyst 1C) of the electrode catalyst (core-shell catalyst) of the present invention.

As shown in FIG. 4, an electrode catalyst 1C of the present invention has catalyst particles 3a each being composed of a core part 4; a shell part 5a covering a part of the surface of the core part 4; and a shell part 5b covering an other part of the surface of the core part 4.

The shell part 5a may have a two-layered structure composed of a first shell part 6a and a second shell part 7a.

Further, the shell part 5b may have a two-layered structure composed of a first shell part 6b and a second shell part 7b.

That is, the catalyst particles 3a have a so-called "core-shell structure" comprised of the core part 4; the shell part 5a (first shell part 6a and second shell part 7a) formed on the core part 4; and the shell part 5b (first shell part 6b and second shell part 7b) formed on the core part 4.

With regard to the shell part 5b composing the catalyst particle 3a shown in FIG. 4, there is a part of the first shell part 6b that is not covered by the second shell part 7b. The part of the first shell part 6b that is not covered by the second shell part 7b composes a first shell part-exposed surface 6s.

With regard to the shell part 5a composing the catalyst particle 3 shown in FIG. 4, it is preferred that the whole range of the first shell part 6a be substantially covered by the second shell part 7a.

Further, as shown in FIG. 4 and with regard to the shell part 5b composing each catalyst particle 3a, also permissible is a state where a part of the surface of the first shell part 6b is covered, and the surface of the first shell part 6b is thus partially exposed (e.g. a state shown in FIG. 4 where the part 6s of the surface of the first shell part 6b is exposed), provided that the effects of the present invention can be achieved.

Moreover, on the premise that the effects of the present invention can be achieved, the electrode catalyst 1 may allow a "complex of the core part 4 and shell part 5 with the whole range of the surface of the core part 4 being substantially covered by the shell part 5" and a "complex of the core part 4 and shell part 5 with the surface of the core part 4 being partially covered by the shell part 5" to coexist on the support 2 in a mixed manner.

Specifically, the electrode catalyst of the present invention may be in a state where the electrode catalysts 1 and 1A shown in FIGS. 1 and 2 and the electrode catalysts 1B and 1C shown in FIGS. 3 and 4 coexist in a mixed manner, provided the effects of the present invention can be achieved.

Further, the electrode catalyst of the present invention may allow the shell part 5a and the shell part 5b to coexist in a mixed manner with respect to an identical core part 4, as shown in FIG. 4, provided that the effects of the present invention can be achieved.

Furthermore, on the premise that the effects of the present invention can be achieved, the electrode catalyst of the present invention may allow only the shell part 5a to exist with respect to an identical core part 4 or only the shell part 5b to exist with respect to an identical core part 4 (none of these states are shown in the drawings).

Furthermore, on the premise that the effects of the present invention can be achieved, the electrode catalyst 1 may also be in a state where "particles only comprised of the core parts 4 that are not covered by the shell parts 5" are supported on the support 2, in addition to at least one kind of the electrode catalysts 1, 1A, 1B and 1C (not shown).

Furthermore, on the premise that the effects of the present invention can be achieved, the electrode catalyst 1 may also be in a state where "particles only composed of the constituent element of the shell part 5" are supported on the support 2 without being in contact with the core parts 4, in addition to at least one kind of the electrode catalysts 1, 1A, 1B and 1C (not shown).

Furthermore, on the premise that the effects of the present invention can be achieved, the electrode catalyst 1 may also be in a state where "particles only comprised of the core parts 4 that are not covered by the shell parts 5" and "particles only composed of the constituent element of the shell part 5" are individually and independently supported on the support 2, in addition to at least one kind of the electrode catalysts 1, 1A, 1B and 1C.

It is preferred that the core part 4 have an average particle diameter of 2 to 40 nm, more preferably 4 to 20 nm, particularly preferably 5 to 15 nm.

As for the thickness of the shell part 5 (thickness from the surface in contact with the core part 4 to the outer surface of the shell part 5), a preferable range thereof is to be appropriately determined based on the design concept(s) of the electrode catalyst.

For example, when the amount of the metal element (e.g. platinum) used to compose the shell part 5 is intended to be minimized, a layer composed of one atom (one atomic layer) is preferred. In this case, when there is only one kind of metal element composing the shell part 5, it is preferred that the thickness of the shell part 5 be twice as large as the diameter of one atom of such metal element (in spherical approximation). Further, when there are not fewer than two kinds of metal elements composing the shell part 5, it is preferred that the thickness of the shell part 5 be that of a layer of one atom (one atomic layer formed with two or more kinds of atoms being apposed on the surface of the core part 4).

Further, for example, when attempting to improve a durability by employing a shell part 5 of a larger thickness, it is preferred that such thickness be 1 to 10 nm, more preferably 2 to 5 nm.

When the shell part 5 has the two-layered structure composed of the first shell part 6 and the second shell part 7, preferable ranges of the thicknesses of the first shell part 6 and second shell part 7 are appropriately determined based on the design concept(s) of the electrode catalyst of the present invention.

For example, when the amount of a noble metal such as platinum (Pt) as a metal element contained in the second shell part 7 is intended to be minimized, it is preferred that the second shell part 7 be a layer composed of one atom (one atomic layer). In this case, when there is only one kind of metal element composing the second shell part 7, it is preferred that the thickness of the second shell part 7 be approximately twice as large as the diameter of one atom of such metal element (provided that an atom is considered as a sphere).

Further, when there are not fewer than two kinds of metal elements contained in the second shell part 7, it is preferred that the second shell part 7 have a thickness equivalent to that of a layer composed of not fewer than one kind of atom (one atomic layer formed with two or more kinds of atoms being apposed in the surface direction of the core part 4). For example, when attempting to improve the durability of the electrode catalyst by employing a second shell part 7 of a larger thickness, it is preferred that the thickness of the second shell part 7 be 1.0 to 5.0 nm. If the durability of the electrode catalyst is to be further improved, it is preferred that the thickness of the second shell part 7 be 2.0 to 10.0 nm.

Here, in the present invention, "average particle diameter" refers to an average value of the diameters of an arbitrary number of particles as particle groups that are observed through electron micrographs.

There are no particular restrictions on the support 2, as long as such support 2 is capable of supporting the catalyst particles 3 as the complexes composed of the core parts 4 and the shell parts 5, and has a large surface area.

Moreover, it is preferred that the support 2 be that exhibiting a favorable dispersibility and a superior electrical conductivity in a composition used to form a gas diffusion electrode having the electrode catalyst 1.

The support 2 may be appropriately selected from carbon-based materials such as glassy carbon (GC), fine carbon, carbon black, black lead, carbon fiber, activated carbon, ground product of activated carbon, carbon nanofiber and carbon nanotube; and glass-based or ceramic-based materials such as oxides.

Among these materials, carbon-based materials are preferred in terms of their adsorptivities with respect to the core part 4 and in terms of a BET specific surface area of the support 2.

Further, as a carbon-based material, an electrically conductive carbon is preferred. Particularly, an electrically conductive carbon black is preferred as an electrically conductive carbon. Examples of such electrically conductive carbon black include products by the names of "Ketjenblack EC300 J," "Ketjenblack EC600" and "Carbon EPC" (produced by Lion Corporation).

There are no particular restrictions on the component of the core part 4, as long as the component is capable of being covered by the shell part 5.

When the shell part 5 employs a one-layered structure as are the cases with the electrode catalysts 1 and 1A that are shown in FIGS. 1 and 2 instead of the two-layered structure, the core part 4 may also employ a noble metal(s). The core part 4 composing the catalyst particles 3 and 3a of the electrode catalysts 1 and 1A, contains at least one metal selected from the group consisting of palladium (Pd), a palladium (Pd) alloy, a platinum (Pt) alloy, gold (Au), nickel (Ni) and a nickel (Ni) alloy.

There are no particular restrictions on a palladium (Pd) alloy, as long as the alloy is to be obtained by combining palladium (Pd) with an other metal capable of forming an alloy when combined with palladium (Pd). For example, such palladium (Pd) alloy may be a two-component palladium (Pd) alloy obtained by combining palladium (Pd) with an other metal; or a three or more-component palladium (Pd) alloy obtained by combining palladium (Pd) with not fewer than two kinds of other metals. Specifically, examples of such two-component palladium (Pd) alloy include gold palladium (PdAu), silver palladium (PdAg) and copper palladium (PdCu). One example of a three-component palladium (Pd) alloy is gold-silver-palladium (PdAuAg).

There are no particular restrictions on a platinum (Pt) alloy, as long as the alloy is to be obtained by combining platinum (Pt) with an other metal capable of forming an alloy when combined with platinum (Pt). For example, such platinum (Pt) alloy may be a two-component platinum (Pt) alloy obtained by combining platinum (Pt) with an other metal; or a three or more-component platinum (Pt) alloy obtained by combining platinum (Pt) with not fewer than two kinds of other metals. Specifically, examples of such two-component platinum (Pt) alloy include nickel platinum (PtNi) and cobalt platinum (PtCo).

There are no particular restrictions on a nickel (Ni) alloy, as long as the alloy is to be obtained by combining nickel (Ni) with an other metal capable of forming an alloy when combined with nickel (Ni). For example, such nickel (Ni) alloy may be a two-component nickel (Ni) alloy obtained by combining nickel (Ni) with an other metal; or a three or more-component nickel (Ni) alloy obtained by combining nickel (Ni) with not fewer than two kinds of other metals. Specifically, one example of such two-component nickel (Ni) alloy is tungsten nickel (NiW).

The shell part 5 contains at least one kind of metal selected from platinum (Pt) and a platinum (Pt) alloy. There are no particular restrictions on a platinum (Pt) alloy, as long as the alloy is to be obtained by combining platinum (Pt) with an other metal capable of forming an alloy when combined with platinum (Pt). For example, such platinum (Pt) alloy may be a two-component platinum (Pt) alloy obtained by combining platinum (Pt) with an other metal; or a three or more-component platinum (Pt) alloy obtained by combining platinum (Pt) with not fewer than two kinds of other metals. Specifically, examples of such two-component platinum (Pt) alloy include nickel platinum (PtNi), cobalt platinum (PtCo), platinum ruthenium (PtRu), platinum molybdenum (PtMo) and platinum titanium (PtTi). Particularly, in order for the shell part 5 to have a poisoning resistance, it is preferred that a platinum ruthenium (PtRu) alloy be used.

As are the cases with the electrode catalysts 1B and 1C that are shown in FIGS. 3 and 4, when the shell part 5 employs the two-layered structure composed of the first shell part 6 and the second shell part 7, a metal element(s) other than noble metals may be the main component especially from the perspective of reducing the cost for producing the electrode catalyst 1. Specifically, it is preferred that the core part 4 be composed of a metal element(s) other than platinum (Pt) and palladium (Pd), a metal compound of such metal and/or a mixture of such metal and such metal compound. It is more preferred that the core part 4 be composed of a metal element(s) other noble metals, a metal compound of such metal and/or a mixture of such metal and such metal compound.

A supported amount of the platinum (Pt) contained in the shell part 5 is 5 to 30% by weight, preferably 8 to 25% by weight with respect to the weight of the electrode catalyst 1. It is preferred that the amount of the platinum (Pt) supported be not smaller than 5% by weight, because the electrode catalyst can fully exert its catalytic activity in such case. It is also preferred that the amount of the platinum (Pt) supported be not larger than 30% by weight, because the amount of platinum (Pt) used is thus reduced in such case, which is favorable in terms of production cost.

In the case where the shell part 5 has the two-layered structure composed of the first shell part 6 and the second shell part 7, it is preferred that the first shell part 6 contain at least one kind of metal selected from the group consisting of palladium (Pd), a palladium (Pd) alloy, a platinum (Pt) alloy, gold (Au), nickel (Ni) and a nickel (Ni) alloy, and it is more preferred that the first shell part 6 contain palladium (Pd) simple substance.

From the perspective of further improving the catalytic activities of the electrode catalysts 1B and 1C and more easily obtaining the same, it is preferred that the first shell part 6 be mainly composed of palladium (Pd) simple substance (not less than 50 wt %), and it is more preferred that such first shell part 6 be only composed of palladium (Pd) simple substance.

It is preferred that the second shell part 7 contain at least one kind of metal selected from platinum (Pt) and a platinum (Pt) alloy, and it is more preferred that such shell part 7 contain platinum (Pt) simple substance.

From the perspective of further improving the catalytic activities of the electrode catalysts 1B and 1C and more easily obtaining the same, it is preferred that the second shell part 7 be mainly composed of platinum (Pt) simple substance (not less than 50 wt %), and it is more preferred that such second shell part 7 be only composed of platinum (Pt) simple substance.

The electrode catalyst 1 exhibits a bromine (Br) species concentration of not higher than 500 ppm when measured through X-ray fluorescence (XRF) spectroscopy; and a chlorine (Cl) species concentration of not higher than 8,500 ppm when measured through the same analytical method.

Even when the chlorine (Cl) species contained in the electrode catalyst 1 is in an extremely high concentration of 8,500 ppm, the electrode catalyst 1 is able to fully exert its catalytic activity by having a bromine (Br) species concentration of not higher than 500 ppm. Further, the electrode catalyst 1 is suitable for mass production and production cost reduction due to the fact that not special and complex production process is required to remove chlorine.

Here, the bromine (Br) species concentration and the chlorine (Cl) species concentration are measured through X-ray fluorescence (XRF) spectroscopy. A value obtained by measuring the bromine (Br) species contained in the electrode catalyst through X-ray fluorescence (XRF) spectroscopy is the bromine (Br) species concentration. Similarly, a value obtained by measuring the chlorine (Cl) species contained in the electrode catalyst through X-ray fluorescence (XRF) spectroscopy is the chlorine (Cl) species concentration.

Here, the bromine (Br) species concentration and the chlorine (Cl) species concentration are respectively the concentrations of the bromine atoms and chlorine atoms in terms of the bromine and chlorine elements contained in the electrode catalyst.

X-ray fluorescence (XRF) spectroscopy is a method where a specimen containing a particular element A is irradiated with a primary X-ray to generate a fluorescent X-ray of such element A, followed by measuring the intensity of such fluorescent X-ray of the element A such that quantitative analysis of the captioned element A contained in the specimen can be performed. When performing quantitative analysis through X-ray fluorescence (XRF) spectroscopy, there may be employed the fundamental parameter method (FP method) used in theoretical operation.

The FP method applies the idea that if the compositions and kinds of the elements contained in a specimen are all known, the fluorescent X-ray (XRF) intensities thereof can be individually and theoretically calculated. In addition, the FP method allows there to be estimated a composition(s) corresponding to the fluorescent X-ray (XRF) of each element that is obtained by measuring the specimen.

X-ray fluorescence (XRF) spectroscopy is performed using general fluorescent X-ray (XRF) analyzers such as an energy dispersive fluorescent X-ray (XRF) analyzer, a scanning-type fluorescent X-ray (XRF) analyzer and a multi-element simultaneous-type fluorescent X-ray (XRF) analyzer. A fluorescent X-ray (XRF) analyzer is equipped with a software which makes it possible to process the experimental data regarding the correlation between the intensity of the fluorescent X-ray (XRF) of the element A and the concentration of the element A.

There are no particular restrictions on such software, as long as the software is that generally used to perform X-ray fluorescence (XRF) spectroscopy.

For example, there may be employed a software for use in a general fluorescent X-ray (XRF) analyzer adopting the FP method, such as an analysis software: "UniQuant 5." Here, one example of the abovementioned fluorescent X-ray (XRF) analyzer is a full-automatic wavelength dispersive fluorescent X-ray analyzer (product name: Axios by Spectris Co., Ltd.)

The electrode catalyst 1 exhibits a bromine (Br) species concentration of not higher than 500 ppm when measured by the aforementioned X-ray fluorescence (XRF) spectroscopy. However, from the perspective of further reliably achieving the effects of the present invention, it preferred that the bromine (Br) species concentration be not higher than 300 ppm, more preferably not higher than 200 ppm, and particularly preferably not higher than 100 ppm. A bromine (Br) species concentration of not higher than 500 ppm is preferable, because the electrode catalyst 1 is capable of fully exerting its catalytic activity in such case even when containing a chlorine (Cl) species of a high concentration.

In order to achieve a bromine (Br) species concentration of not higher than 500 ppm when measured by the aforementioned X-ray fluorescence (XRF) spectroscopy, it is required that a metal compound as a staring material of the electrode catalyst 1 and a reagent(s) used in each production step of the electrode catalyst 1 be carefully selected. Specifically, there may, for example, be used a metal compound that does not generate bromine (Br) species, as the metal compound serving as the starting material of the electrode catalyst 1. Further, there may, for example, be employed a compound(s) that do not contain bromine (Br) species, as the reagent(s) used in the production steps of the electrode catalyst 1.

Moreover, while the electrode catalyst 1 exhibits a chlorine (Cl) species concentration of not higher than 8,500 ppm when measured by the abovementioned X-ray fluorescence (XRF) spectroscopy, it is preferred that such chlorine (Cl) species concentration be not higher than 7,500 ppm, more preferably not higher than 6,500 ppm, even more preferably not higher than 5,500 ppm, and particularly preferably not higher than 2,500 ppm. In addition, it is especially preferred that the chlorine (Cl) species concentration be 1,000 ppm when measured by such X-ray fluorescence (XRF) spectroscopy.

It is preferable when the chlorine (Cl) species concentration is not higher than 8,500 ppm, because the electrode catalyst 1 is capable of fully exerting its catalytic activity under such condition due to the chlorine (Cl) species. Further, it is preferable when the chlorine (Cl) species concentration is not higher than 8,500 ppm, because the electrode catalyst 1 can thus be produced without the production process of removing the chlorine (Cl) species, in the production process of the electrode catalyst 1.

The electrode catalyst 1 of the present invention is capable of fully delivering its performance as an electrode catalyst even when the chlorine (Cl) species concentration measured by the abovementioned X-ray fluorescence (XRF) spectroscopy is not lower than 900 ppm, or even greater than 5,000 ppm.

That is, one technical feature of the electrode catalyst of the present invention is that bromine (Br) species is focused, and the bromine (Br) species concentration measured by the abovementioned X-ray fluorescence (XRF) spectroscopy is regulated to not higher than 500 ppm such that the electrode catalyst is allowed to fully deliver its performance even when the chlorine (Cl) species concentration measured by the abovementioned X-ray fluorescence (XRF) spectroscopy is greater than 5,000 ppm (not higher than 8,500 ppm).

In order to achieve a chlorine (Cl) species concentration of not higher than 8,500 ppm when measured by the abovementioned X-ray fluorescence (XRF) spectroscopy, it is required that a metal compound as a staring material of the electrode catalyst 1 and reagents used in production steps of the electrode catalyst be carefully selected. Specifically, there may, for example, be used a metal compound that does not generate chlorine (Cl) species, as the metal compound serving as the starting material of the electrode catalyst 1. Further, there may, for example, be employed compounds that do not contain chlorine (Cl) species, as the reagents used in the production steps of the electrode catalyst 1.

Further, chlorine (Cl) species can be reduced to approximately several tens of ppm by employing the chlorine reduction methods described later.

A production method of the electrode catalyst 1 includes a step of producing an electrode catalyst precursor; and a step of washing such catalyst precursor to meet the condition where the bromine (Br) species concentration measured by the X-ray fluorescence (XRF) spectroscopy is not higher than 500 ppm, and the chlorine (Cl) species concentration measured by the same method is not higher than 8,500 ppm.

The electrode catalyst precursor of the electrode catalyst 1 is produced by having the support 2 support the catalyst components (core part 4, shell part 5) of the electrode catalyst.

There are no particular restrictions on a production method of the electrode catalyst precursor as long as the method allows the catalyst components of the electrode catalyst 1 to be supported on the support 2.

Examples of the production method of the electrode catalyst precursor include an impregnation method where a solution containing the catalyst components of the electrode catalyst 1 is brought into contact with the support 2 to impregnate the support 2 with the catalyst components; a liquid phase reduction method where a reductant is put into a solution containing the catalyst components of the electrode catalyst 1; an electrochemical deposition method such as under-potential deposition (UPD); a chemical reduction method; a reductive deposition method using adsorption hydrogen; a surface leaching method of alloy catalyst; immersion plating; a displacement plating method; a sputtering method; and a vacuum evaporation method.

Next, the concentrations of the bromine (Br) species and chlorine (Cl) species of the electrode catalyst precursor are adjusted to meet the condition where the bromine (Br) species concentration measured by the X-ray fluorescence (XRF) spectroscopy is not higher than 500 ppm, and the chlorine (Cl) species concentration measured by the same method is not higher than 8,500 ppm. Specifically, there are employed the following chlorine reduction methods 1 to 3.

A chlorine reduction method 1 includes a first step and a second step.

First step: The first step is to prepare a first liquid with an electrode catalyst precursor (I) being dispersed in an ultrapure water. The first liquid is prepared by adding such electrode catalyst precursor (I) to the ultrapure water. Here, the electrode catalyst precursor (I) is produced using a material containing chlorine (Cl) species, and exhibits a chlorine (Cl) species concentration higher than a predetermined chlorine (Cl) species concentration when measured by the X-ray fluorescence (XRF) spectroscopy (e.g. an electrode catalyst precursor exhibiting a chlorine (Cl) species concentration value higher than 8,500 ppm or 7,600 ppm, provided that 8,500 ppm or 7,600 ppm is the predetermined chlorine (Cl) species concentration).

Second step: The second step is to prepare a second liquid with an electrode catalyst precursor (II) being dispersed in the ultrapure water. Specifically, the electrode catalyst precursor (I) contained in the first liquid is filtrated and washed using the ultrapure water, followed by repeatedly washing the same until a filtrate obtained after washing has exhibited an electric conductivity $\rho$ that is not higher than a predetermined value when measured by a JIS-standard testing method (JIS K0552) (e.g. not higher than a value predetermined within a range of 10 to 100 µS/cm). In this way, there is obtained the electrode catalyst precursor (II) as well as the second liquid with such electrode catalyst precursor (II) being dispersed in the ultrapure water.

A chlorine reduction method 2 includes a first step, a second step, a third step and a fourth step.

First step: The first step is to retain a liquid containing an ultrapure water, a reductant and an electrode catalyst precursor under at least one temperature predetermined within a range of 20 to 90° C. for a predetermined retention time. Here, the electrode catalyst precursor is produced using a material containing chlorine (Cl) species, and exhibits a chlorine (Cl) species concentration higher than a predetermined chlorine (Cl) species concentration when measured by the X-ray fluorescence (XRF) spectroscopy (e.g. an electrode catalyst precursor exhibiting a chlorine (Cl) species concentration value higher than 8,500 ppm or 6,000 ppm, provided that 8,500 ppm or 6,000 ppm is the predetermined chlorine concentration).

Second step: The second step is to add the ultrapure water to the liquid obtained in the first step so as to prepare a first liquid where an electrode catalyst precursor (I) contained in the liquid obtained in the first step is dispersed in the ultrapure water.

Third step: The third step is to filtrate and wash the electrode catalyst precursor contained in the first liquid using the ultrapure water, followed by repeatedly washing the same until a filtrate obtained after washing has exhibited an electric conductivity $\rho$ that is not higher than a predetermined first value when measured by a JIS-standard testing method (JIS K0552). In this way, there is now obtained a second liquid where dispersed in the ultrapure water is the electrode catalyst precursor contained in the liquid having an electric conductivity $\rho$ that is not higher than the predetermined first value.

Fourth step: The fourth step is to dry the second liquid.

A chlorine reduction method 3 includes a first step.

First step: The first step is to retain a liquid containing an ultrapure water, a gas having hydrogen and an electrode catalyst precursor under at least one temperature predetermined within a range of 20 to 40° C. for a predetermined retention time. Here, the electrode catalyst precursor is produced using a material containing chlorine (Cl) species, and exhibits a chlorine (Cl) species concentration higher than a predetermined chlorine (Cl) species concentration when measured by the X-ray fluorescence (XRF) spectroscopy.

The "ultrapure water" used in the chlorine reduction methods 1 to 3 is a type of water exhibiting a specific resistance R of not lower than 3.0 MΩ·cm, such specific resistance R being represented by the following general formula (1) (i.e. an inverse number of the electric conductivity measured by the JIS-standard testing method (JIS K0552)). Further, it is preferred that the "ultrapure water" have a water quality equivalent to or clearer than "A3" as defined in JISK 0557 "Water used for industrial water and wastewater analysis."

[Formula 1]

$$R = 1/\rho \qquad (1)$$

In the above general formula (1), R represents the specific resistance, and ρ represents the electric conductivity measured by the JIS-standard testing method (JIS K0552).

There are no particular restrictions on the ultrapure water, as long as the water has an electric conductivity that satisfies the relationship represented by the general formula (1). Examples of such ultrapure water include an ultrapure water produced using an ultrapure water system from "Milli-Q series" (by Merck Ltd.); and an ultrapure water produced using an ultrapure water system from "Elix UV series" (by Nihon Millipore K.K.).

The chlorine (Cl) species contained in the electrode catalyst precursor can be reduced by performing any one of the chlorine reduction methods 1 to 3. Further, an electrode catalyst precursor exhibiting a bromine (Br) species concentration of not higher than 500 ppm and a chlorine (Cl) species concentration of not higher than 8,500 ppm when measured by the X-ray fluorescence (XRF) spectroscopy, is considered as the electrode catalyst of the present invention.

The electrode catalyst is capable of exerting a level of catalytic activity required as an electrode catalyst, due to the fact that the electrode catalyst has a chlorine (Cl) species concentration of not higher than 8,500 ppm and a bromine (Br) species concentration of not higher than 500 ppm when measured by the X-ray fluorescence (XRF) spectroscopy.

The X-ray fluorescence (XRF) spectroscopy is, for example, performed in the following manner.

(1) Measurement Device

Full-automatic wavelength dispersive fluorescent X-ray analyzer Axios (by Spectris Co., Ltd.)

(2) Measurement Condition

Analysis software: "UniQuant 5" (Semi-quantitative analysis software employing FP (four peak method))

XRF measurement chamber atmosphere: Helium (normal pressure)

(3) Measurement Procedure (i) Placing a sample-containing sample container into an XRF sample chamber (ii) Replacing an atmosphere in the XRF sample chamber with helium gas (iii) Setting the measurement condition to "UQ5 application" as a condition required to use the analysis software "UniQuant 5" and configuring a mode where calculation is performed in a mode with the main component of the sample being "carbon (constituent element of support)" and with a sample analysis result-display format being "element," under a helium gas atmosphere (normal pressure)

Figure 5:
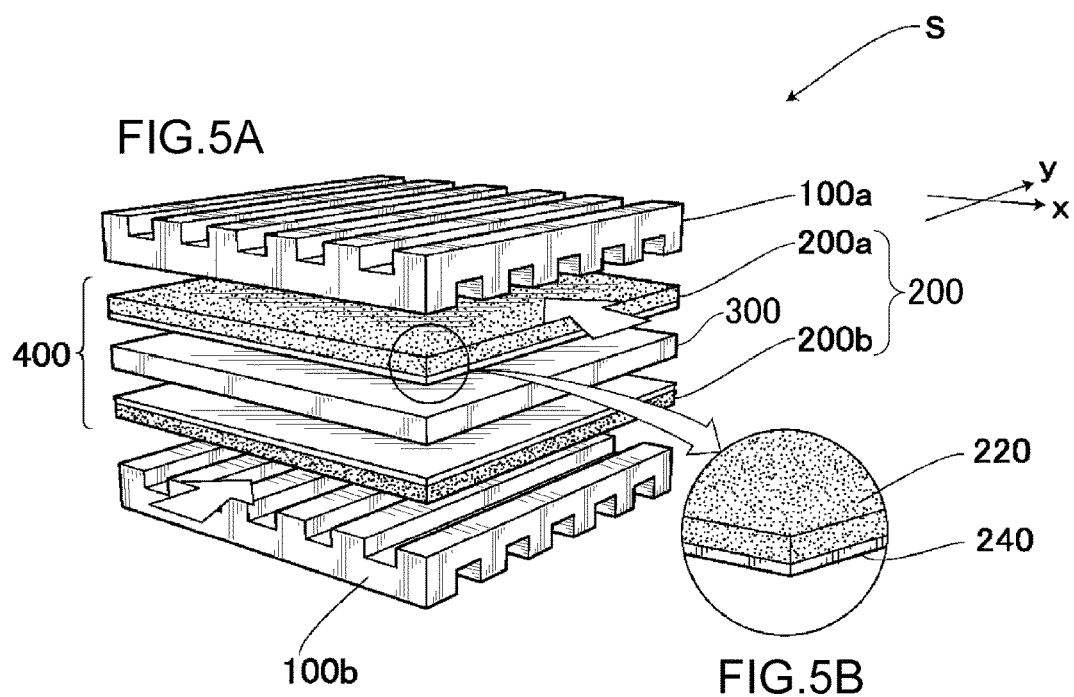
FIG. 5A is a schematic diagram showing a preferred embodiment of a fuel cell stack of the present invention.
FIG. 5B is a magnified portion of FIG. 5A illustrating the gas diffusion layer and an electrode catalyst layer of the present invention.

FIGS. 5A and 5B are a schematic view showing preferable embodiments of a composition for forming gas diffusion electrode containing the electrode catalyst of the present invention; a gas diffusion electrode produced using such composition for forming gas diffusion electrode; a membrane-electrode assembly (MEA) having such gas diffusion electrode; and a fuel cell stack having such membrane-electrode assembly (MEA).

As for a fuel cell stack S shown in FIG. 5A, each membrane-electrode assembly (MEA) 400 serves as a one-unit cell, and the fuel cell stack S is configured by stacking multiple layers of such one-unit cells.

Particularly, the fuel cell stack S has a membrane-electrode assembly (MEA) 400 that is equipped with an anode 200a, a cathode 200b and an electrolyte membrane 300 provided between these electrodes.

More particularly, the fuel cell stack S has a structure where the membrane-electrode assembly (MEA) 400 is sandwiched between a separator 100a and a separator 100b.

Described hereunder are the composition for forming gas diffusion electrode, a gas diffusion electrode 200a, a gas diffusion electrode 200b and the membrane-electrode assembly (MEA) 400, all of which serve as members of the fuel cell stack S containing the electrode catalyst of the present invention.

The electrode catalyst 1 can be used as a so-called catalyst ink component and serve as the composition for forming gas diffusion electrode in the present invention. One feature of the composition for forming gas diffusion electrode in the present invention is that this composition contains the aforementioned electrode catalyst. The main components of the composition for forming gas diffusion electrode are the abovementioned electrode catalyst and an ionomer solution. The ionomer solution contains water, an alcohol and a polyelectrolyte exhibiting a hydrogen ion conductivity.

A mixing ratio between water and an alcohol in the ionomer solution can be any ratio, as long as it is the kind of ratio capable of endowing a viscosity suitable for applying to the electrode the composition for forming gas diffusion electrode. In general, it is preferred that an alcohol be contained in an amount of 0.1 to 50.0 parts by weight with respect to 100 parts by weight of water. Further, it is preferred that the alcohol contained in the ionomer solution be a monohydric alcohol or a polyhydric alcohol. Examples of a monohydric alcohol include methanol, ethanol, propanol and butanol. Examples of a polyhydric alcohol include dihydric alcohols or trihydric alcohols. As a dihydric alcohol, there can be listed, for example, ethylene glycol, diethylene glycol, tetraethylene glycol, propylene glycol, 1,3-butanediol and 1,4-butanediol. As a trihydric alcohol, there may be used glycerin, for example. Further, the alcohol contained in the ionomer solution may be either one kind of alcohol or a combination of two or more kinds of alcohols. Here, the ionomer solution may also be appropriately allowed to contain an additive(s) such as a surfactant, if necessary.

For the purpose of dispersing the electrode catalyst, the ionomer solution contains a hydrogen ion-conductive polyelectrolyte as a binder component for improving an adhesion to a gas diffusion layer as a part composing the gas diffusion electrode. Although there are no particular restrictions on the polyelectrolyte, examples of such polyelectrolyte include known perfluorocarbon resins having sulfonate groups and/or carboxylic acid groups. As an easily obtainable hydrogen ion-conductive polyelectrolyte, there can be listed, for example, Nafion (registered trademark of Du Pont), ACIPLEX (registered trademark of Asahi Kasei Chemical Corporation) and Flemion (registered trademark of ASAHI GLASS Co., Ltd).

The composition for forming gas diffusion electrode can be produced by mixing, crushing and stirring the electrode catalyst and the ionomer solution. The composition for forming gas diffusion electrode may be prepared using crushing and mixing machines such as a ball mill and/or an ultrasonic disperser. A crushing and a stirring conditions at the time of operating a crushing and mixing machine can be appropriately determined in accordance with the mode of the composition for forming gas diffusion electrode.

It is required that the composition of each of the electrode catalyst, water, alcohol(s) and hydrogen ion-conductive polyelectrolyte that are contained in the composition for forming gas diffusion electrode be that capable of achieving a favorable dispersion state of the electrode catalyst, allowing the electrode catalyst to be distributed throughout an entire catalyst layer of the gas diffusion electrode and improving the power generation performance of the fuel cell.

Particularly, it is preferred that the polyelectrolyte, alcohol(s) and water be respectively contained in an amount of 0.1 to 2.0 parts by weight, an amount of 0.01 to 2.0 parts by weight and an amount of 2.0 to 20.0 parts by weight with respect to 1.0 parts by weight of the electrode catalyst. It is more preferred that the polyelectrolyte, alcohol(s) and water be respectively contained in an amount of 0.3 to 1.0 parts by weight, an amount of 0.1 to 2.0 parts by weight and an amount of 5.0 to 6.0 parts by weight with respect to 1.0 parts by weight of the electrode catalyst. It is preferred that the composition of each component be within the abovementioned ranges, because when the composition of each component is within these ranges, not only a coating film made of the composition for forming gas diffusion electrode will not be spread extremely extensively on the gas diffusion electrode at the time of forming the film, but the coating film formed of the composition for forming gas diffusion electrode is also allowed to have an appropriate and uniform thickness.

Here, the weight of the polyelectrolyte refers to a weight when it is dry i.e. a weight without a solvent in a polyelectrolyte solution, whereas the weight of water refers to a weight including a water contained in the polyelectrolyte solution.

The gas diffusion electrode (200a, 200b) of the present invention has a gas diffusion layer 220; and an electrode catalyst layer 240 laminated on at least one surface of the gas diffusion layer 220. The aforementioned electrode catalyst is contained in the electrode catalyst layer 240 equipped to the gas diffusion electrode (200a, 200b). The gas diffusion electrode 200 of the present invention can be used as an anode and an cathode.

In FIG. 5A, the gas diffusion electrode 200 on the upper side is referred to as the anode 200a, whereas the gas diffusion electrode 200 on the lower side is referred to as the cathode 200b for the sake of convenience.

In the case of the anode 200a, the electrode catalyst layer 240 serves as a layer where a chemical reaction of dissociating a hydrogen gas sent from the gas diffusion layer 220 into hydrogen ions takes place due to the function of the electrode catalyst 1 contained in the electrode catalyst layer 240. Further, in the case of the cathode 200b, the electrode catalyst layer 240 serves as a layer where a chemical reaction of bonding an air (oxygen gas) sent from the gas diffusion layer 220 and the hydrogen ions that have traveled from the anode through the electrolyte membrane takes place due to the function of the electrode catalyst 1 contained in the electrode catalyst layer 240.

The electrode catalyst layer 240 is formed using the abovementioned composition for forming gas diffusion electrode. It is preferred that the electrode catalyst layer 240 have a large surface area such that the reaction between the electrode catalyst 1 and the hydrogen gas or air (oxygen gas) sent from the diffusion layer 220 is allowed take place to the fullest extent. Moreover, it is preferred that the electrode catalyst layer 240 be formed in a manner such that the electrode catalyst layer 240 has a uniform thickness as a whole. Although the thickness of the electrode catalyst layer 240 can be appropriately adjusted and there are no restrictions on such thickness, it is preferred that the electrode catalyst layer 240 have a thickness of 2 to 200 μm.

The gas diffusion layer 220 equipped to the gas diffusion electrode 200 serves as a layer provided to diffuse to each of the corresponding electrode catalyst layers 240 the hydrogen gas introduced from outside the fuel cell stack S into gas flow passages that are formed between the separator 100a and the gas diffusion layer 220a; and the air (oxygen gas) introduced from outside the fuel cell stack S into gas passages that are formed between the separator 100b and the gas diffusion layer 220b. In addition, the gas diffusion layer 220 plays a role of supporting the electrode catalyst layer 240 to the gas diffusion electrode 200 so as to immobilize the electrode catalyst layer 240 to the surface of the gas diffusion electrode 220. The gas diffusion layer 220 also plays a role of improving the contact between the electrode catalyst 1 contained in the electrode catalyst layer 240 and the hydrogen gas as well as air (oxygen gas).

The gas diffusion layer 220 has a function of favorably passing the hydrogen gas or air (oxygen gas) supplied from the gas diffusion layer 220 and then allowing such hydrogen gas or air to arrive at the electrode catalyst layer 240. For this reason, it is preferred that the gas diffusion layer 220 have a water-repellent property such that a pore structure as a microstructure in the gas diffusion layer 220 will not be blocked by the electrode catalyst 1 and a water generated at the cathode 200b. Therefore, the gas diffusion layer 220 has a water repellent component such as polyethylene terephthalate (PTFE).

There are no particular restrictions on a material(s) that can be used in the gas diffusion layer 220. That is, there can be employed a material(s) known to be used in a gas diffusion layer of a fuel cell electrode. For example, there may be used a carbon paper; or a material made of a carbon paper as a main raw material and an auxiliary raw material applied to the carbon paper as the main raw material, such auxiliary raw material being composed of a carbon powder as an optional ingredient, an ion-exchange water also as an optional ingredient and a polyethylene terephthalate dispersion as a binder. The thickness of the gas diffusion layer can be appropriately determined based on, for example, the size of a cell used in a fuel cell. While there are no particular restrictions on the thickness of the gas diffusion layer, a thin gas diffusion layer is preferred for the purpose of ensuring a short diffusion distance of a reactant gas. Meanwhile, since it is required that the gas diffusion layer also exhibit a mechanical strength at the time of performing coating and during an assembly process, there is usually used a gas diffusion layer having a thickness of about 50 to 300 μm, for example.

As for the gas diffusion electrodes 200a and 200b, an intermediate layer (not shown) may be provided between the gas diffusion layer 220 and the electrode catalyst layer 240. In such case, each of the gas diffusion electrodes 200a and 200b has a three-layered structure composed of the gas diffusion layer, the intermediate layer and the catalyst layer.

A production method of the gas diffusion electrode is described hereunder.

The production method of the gas diffusion electrode includes a step of applying to the gas diffusion layer 220 the composition for forming gas diffusion electrode; and a step of forming the electrode catalyst layer 240 by drying such gas diffusion layer 220 to which the composition for forming gas diffusion electrode has been applied. Specifically, the composition for forming gas diffusion electrode contains the ionomer solution composed of the electrode catalyst 1 with the catalyst components supported on the support; a hydrogen ion-conductive polyelectrolyte; a water; and an alcohol(s).

The important point when applying to the gas diffusion layer 220 the composition for forming gas diffusion electrode is that the composition for forming gas diffusion electrode is to be homogeneously applied to the gas diffusion layer 220. As a result of homogeneously applying the composition for forming gas diffusion electrode, there can be formed on the gas diffusion layer 220 a coating film that has a uniform thickness and is made of the composition for forming gas diffusion electrode. Although an application quantity of the composition for forming gas diffusion electrode can be appropriately determined based on a mode of usage of the fuel cell, it is preferred that the quantity be 0.1 to 0.5 (mg/cm$^2$) in terms of the amount of an active metal such as platinum contained in the electrode catalyst layer 240, from the perspective of a cell performance of a fuel cell having a gas diffusion electrode.

Next, after applying to the gas diffusion layer 220 the composition for forming gas diffusion electrode, the coating film of the composition for forming gas diffusion electrode that has been applied to the gas diffusion layer 220 is dried so as to form the electrode catalyst layer 240 on the gas diffusion layer 220. By heating the gas diffusion layer 220 on which the coating film of the composition for forming gas diffusion electrode has been formed, the water and alcohol(s) in the ionomer solution contained in the composition for forming gas diffusion electrode will be evaporated and thus disappear from the composition for forming gas diffusion electrode. As a result, in the step of applying the composition for forming gas diffusion electrode, the coating film of the composition for forming gas diffusion electrode that is formed on the gas diffusion layer 220 becomes the electrode catalyst layer 240 containing the electrode catalyst and polyelectrolyte.

The membrane-electrode assembly 400 of the present invention (Membrane Electrode Assembly, abbreviated as MEA hereunder) has the anode 200a and cathode 200b which serve as the gas diffusion electrodes 200 using the electrode catalyst 1; and the electrolyte membrane 300 dividing these electrodes. The membrane-electrode assembly (MEA) 400 can be produced by stacking the anode 200a, the electrolyte membrane 300 and the cathode 200b in an order of anode 200a, electrolyte 300 and cathode 200b, and then pressure-bonding the same.

As for the fuel cell stack S of the present invention, the one-unit cell (single cell) is established with the separator 100a (anode side) being attached to an outer side of the anode 200a of the membrane-electrode assembly (MEA) 400 obtained, and with the separator 100b (cathode side) being attached to an outer side of the cathode 200b of the membrane-electrode assembly (MEA) 400, respectively. Further, the fuel cell stack S is obtained by integrating such one-unit cells (single cells). Furthermore, a fuel cell system is completed by attaching a peripheral device(s) to the fuel cell stack S and assembling the same.

The present invention is described in greater detail hereunder with reference to working examples. However, the present invention is not limited to the following working examples.

Here, the inventors of the present invention confirmed that iodine (I) species was not detected from the catalysts of the working and comparative examples, when employing the X-ray fluorescence (XRF) spectroscopy.

Further, unless otherwise noted in the description of each step of the following production method, these steps were carried out under a room temperature and in the air.

The electrode catalyst of the present invention was produced through the following process. The raw materials of the electrode catalyst that were used in the working examples are as follows.

Carbon black powder: product name "Ketjen Black EC300" (by Ketjen Black International Co.)
Sodium tetrachloropalladate (II)
Palladium nitrate
Potassium chloroplatinate As a support of the electrode catalyst, there was used a carbon black powder which was dispersed in a water to prepare a dispersion liquid of 5.0 g/L. An aqueous solution of sodium tetrachloropalladate (II) (concentration 20% by mass) of 5 mL was then delivered by drops into and mixed with such dispersion liquid. An aqueous solution of sodium formate (100 g/L) of 100 mL was further delivered by drops into a dispersion liquid thus obtained, followed by taking the insoluble components through filtering and then washing the taken insoluble components with a pure water. After performing drying, there was then obtained a palladium (core)-supported carbon with palladium being supported on carbon black.

An aqueous solution of copper sulfate of 50 mM was poured into a three-electrode electrolytic cell. A reasonable amount of the palladium-supported carbon prepared above was then added to such three-electrode electrolytic cell, followed by stirring the same and then allowing the three-electrode electrolytic cell to stand still. 450 mV (pair reversible hydrogen electrode) was applied to the working electrode in a resting state such that copper (Cu) could uniformly coat the palladium of the palladium-supported carbon. This is defined as a copper-palladium supported carbon.

An aqueous solution of potassium chloroplatinic acid was delivered by drops into the solution containing the copper-palladium supported carbon with palladium being coated by copper, the aqueous solution of potassium chloroplatinic acid containing platinum (Pt) in an amount two-fold equivalent of the coating copper in terms of substance amount ratio. In this way, the copper (Cu) of the copper-palladium supported carbon was replaced with platinum (Pt).

After filtering a powder of the particles of such platinum palladium-supported carbon obtained by replacing the copper (Cu) of the copper-palladium supported carbon with platinum, without performing drying, an ultrapure water was used to wash the same in a wet state due to a filtrate, followed by drying the same at a temperature of 70° C. Thus, there was obtained an electrode catalyst of the working example 1 which was {platinum (Pt)-palladium (Pd) supported carbon (core part: palladium, shell part: platinum)}.

With regard to the electrode catalyst of the working example 1, the amounts (% by mass) of the platinum and palladium supported were measured by the following method.

The electrode catalyst of the working example 1 was immersed in an aqua regia to dissolve the metal. Then, carbon as an insoluble component was removed from the aqua regia. Next, the aqua regia from which carbon had been removed was subjected to ICP analysis.

The results of ICP analysis were that a platinum supporting amount was 19.3% by mass, and a palladium supporting amount was 24.1% by mass.

Except the fact that the supporting amounts of the platinum (Pt) and palladium (Pd) contained in the electrode catalyst became those represented by the concentrations listed in Tables 1 and 2 (% by mass concentration), electrode catalysts of working examples 2 to 15 and 17 were produced in a similar manner as the working example 1.

Except the fact that a palladium salt as a raw material of the electrode catalyst was changed to achieve the supporting amounts of the platinum (Pt) and palladium (Pd) contained in the electrode catalyst as those represented by the concentrations (% by mass concentration) in Table 1, an electrode catalyst of working example 16 was produced in a similar manner as the working example 1.

An electrode catalyst was prepared in a similar manner as the working example 1. This electrode catalyst was further soaked into an aqueous solution of sulfuric acid (1M) at a normal temperature and for a predetermined period of time. Then, the electrode catalyst in the aqueous solution of sulfuric acid was filtered and washed with an ultrapure water. Next, the electrode catalyst was immersed in an aqueous solution of oxalic acid (0.3M) and retained at a temperature of 90° C. for a predetermined period of time. Next, the electrode catalyst in the aqueous solution of oxalic acid was filtered and washed with the ultrapure water. Next, the electrode catalyst that had been washed with the ultrapure water was dried at a temperature of 70° C. In this way, an electrode catalyst of a working example 18 was obtained.

Further, ICP analysis was performed in a similar manner as the working example 1 for the purpose of measuring the supporting amounts of platinum and palladium.

An electrode catalyst was prepared in a similar manner as the working example 1. This electrode catalyst was further immersed in an aqueous solution of sodium formic acid (0.01M) and retained at a normal temperature and for a predetermined period of time. Next, the electrode catalyst in the aqueous solution of sodium formic acid was filtered and washed with an ultrapure water. Next, the electrode catalyst that had been washed with the ultrapure water was dried at a temperature of 70° C. In this way, electrode catalysts of working examples 19 to 20 were obtained.

Further, ICP analysis was performed in a similar manner as the working example 1 for the purpose of measuring the supporting amounts of platinum and palladium.

An electrode catalyst was prepared in a similar manner as the working example 1. This electrode catalyst was immersed in an aqueous solution of sodium formic acid (0.01M) and retained at a normal temperature and for a predetermined period of time. Next, the electrode catalyst in the aqueous solution of sodium formic acid was filtered and washed with an ultrapure water.

The filtered and washed electrode catalyst was further soaked in an aqueous solution of sulfuric acid (1M) at a normal temperature for a predetermined period of time. Next, the electrode catalyst in the aqueous solution of sulfuric acid was filtered and washed with the ultrapure water. Next, the electrode catalyst was immersed in an aqueous solution of oxalic acid (0.3M) and retained at 90° C. for a predetermined period of time. Next, the electrode catalyst in the aqueous solution of oxalic acid was filtered and washed with the ultrapure water. Next, the electrode catalyst that had been washed with the ultrapure water was dried at a temperature of 70° C. In this way, an electrode catalyst of a working example 21 was obtained.

Further, ICP analysis was performed in a similar manner as the working example 1 for the purpose of measuring the supporting amounts of platinum and palladium.

An electrode catalyst was prepared in a similar manner as the working example 1. This electrode catalyst was further immersed in an aqueous solution of sodium formic acid (0.01M) and retained at 90° C. for a predetermined period of time. Next, the electrode catalyst in the aqueous solution of sodium formic acid was filtered and washed with an ultrapure water. Next, the electrode catalyst that had been washed with the ultrapure water was dried at a temperature of 70° C. In this way, an electrode catalyst of a working example 22 was obtained.

Further, ICP analysis was performed in a similar manner as the working example 1 for the purpose of measuring the supporting amounts of platinum and palladium.

An electrode catalyst was prepared in a similar manner as the working example 1. Then, the electrode catalyst was immersed in an aqueous solution of oxalic acid (0.3M) and retained at 90° C. for a predetermined period of time. Next, the electrode catalyst in the aqueous solution of oxalic acid was filtered and washed with an ultrapure water. Next, the electrode catalyst that had been washed with the ultrapure water was dried at a temperature of 70° C. In this way, an electrode catalyst of a working example 23 was obtained.

Further, ICP analysis was performed in a similar manner as the working example 1 for the purpose of measuring the supporting amounts of platinum and palladium.

Except the fact that the bromine species concentration was adjusted to that shown in Table 3 by using, as a raw material, a potassium chloroplatinic acid whose bromine concentration is 10,000 to 13,000 ppm, the electrode catalysts of comparative examples 1 to 7 were produced in a similar manner as the working example 1.

X-ray fluorescence (XRF) spectrometry was employed to measure the concentrations of the bromine (Br) species and chlorine (Cl) species of the electrode catalysts that are obtained in the working examples 1 to 23, and the comparative examples 1 to 7. The concentrations of the bromine species and chlorine species in the electrode catalysts were measured using the wavelength dispersive fluorescent X-ray analyzer Axios (by Spectris Co., Ltd.). Specifically, the measurement was carried out through the following procedure.

A measurement sample of the electrode catalyst was placed in a XRF sample container equipped to the wavelength dispersive fluorescent X-ray analyzer. The XRF sample container in which the measurement sample of the electrode catalyst had been placed was then put into an XRF sample chamber, followed by replacing an atmosphere in the XRF sample chamber with a helium gas. Later, fluorescent X-ray measurement was conducted under the helium gas atmosphere (normal pressure).

As a software, there was used "UniQuant5" which is an analytic software for use in wavelength dispersive fluorescent X-ray analyzer. A measurement condition(s) were set to "UQ5 application" in accordance with the analytic software "UniQuant5," where calculation is performed in a mode with the main component of the measurement sample of the electrode catalyst being "carbon (constituent element of electrode catalyst support)" and with a sample analysis result-display format being "element." Measurement results were analyzed using the analytic software "UniQuant5" such that the concentrations of bromine (Br) species and chlorine (Cl) species were able to be calculated. The measurement results are shown in Tables 1 to 3.

The catalytic activities of the electrode catalysts produced in the working examples 1 to 23, and the comparative examples 1 to 7, were evaluated by a rotating disk electrode method (RDE method). The catalytic activities of the electrode catalysts were measured by the rotating disk electrode method (RDE method) in the following manner.

A powder of each of the electrode catalysts produced in the working examples 1 to 23 and the comparative examples 1 to 7 was taken by an amount of about 8.0 mg through measurement, and was put into a sample bottle together with an ultrapure water of 2.5 mL, followed by mixing the same while under the influence of an ultrasonic irradiation, thus producing a slurry (suspension) of the electrode catalyst. Next, there was prepared a Nafion-ultrapure water solution by mixing an ultrapure water of 10.0 mL and a 10 wt % Nafion (registered trademark) dispersion aqueous solution (product name "DE1020CS" by Wako Chemical Ltd.) of 20 μL in a different container. The Nafion-ultrapure water solution of 2.5 mL was slowly poured into the sample bottle containing the slurry (suspension) of the electrode catalyst, followed by thoroughly stirring the same at a room temperature for 15 min while under the influence of an ultrasonic irradiation, thus obtaining a composition for forming gas diffusion electrode.

Figure 6:
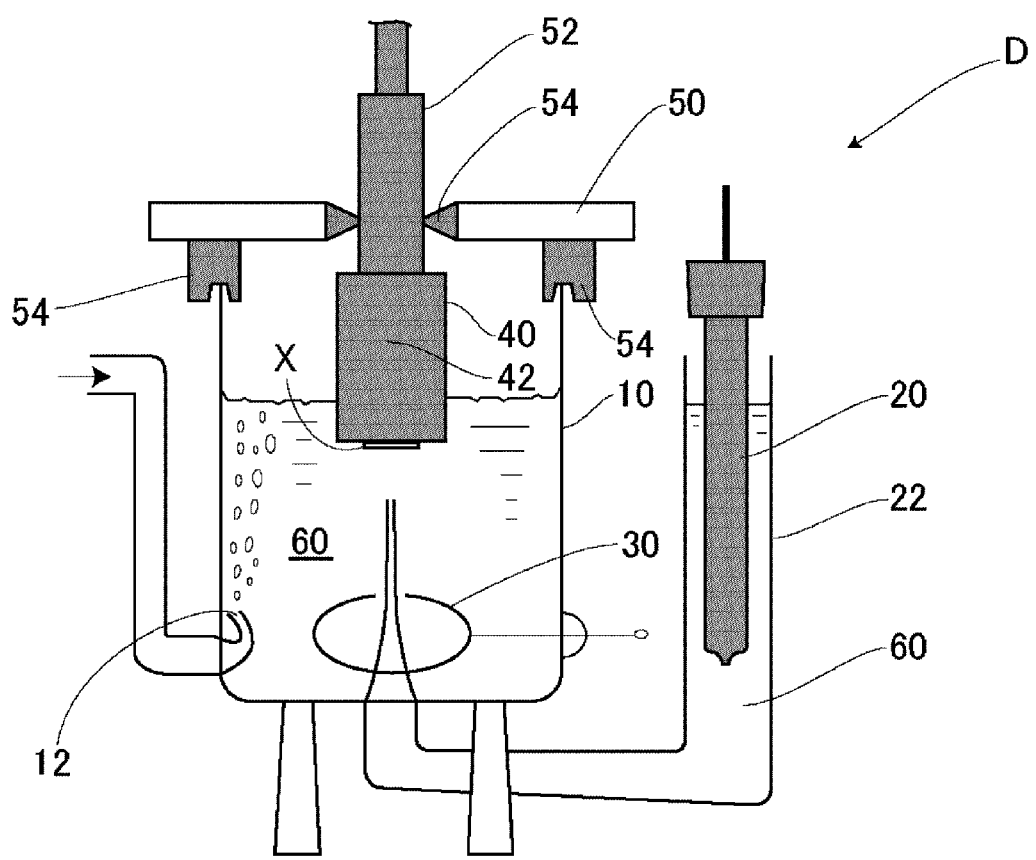
FIG. 6 is a schematic diagram showing a schematic configuration of a rotating disk electrode measuring device equipped with a rotating disc electrode used in a working example.

FIG. 6 is a schematic diagram showing a schematic configuration of a rotating disk electrode measuring device D used in the rotating disk electrode method (RDE method).

As shown in FIG. 6, the rotating disk electrode measuring device D mainly includes a measuring device cell 10, a reference electrode (RE) 20, a counter electrode (CE) 30, a rotating disk electrode 40 and an electrolyte solution 60.

An electrode catalyst layer X was formed on the surface of the rotating disk electrode 40 equipped to the rotating disk electrode measuring device D. Further, the catalyst of the electrode catalyst layer X was evaluated by the rotating disk electrode method.

Particularly, there was used a rotating disk electrode measuring device D (model HSV110 by Hokuto Denko Corp.) employing $HClO_4$ of 0.1M as the electrolyte 60, an Ag/AgCl saturated electrode as the reference electrode (RE) 20 and a Pt mesh with Pt black as the counter electrode (CE) 30.

A method for forming the electrode catalyst layer X on the surface of the rotating disk electrode 40 is described hereunder.

The composition for forming gas diffusion electrode that had been produced above was taken by an amount of 10 μL, and was delivered by drops onto the surface of the clean rotating disk electrode (made of glassy carbon, diameter 5.0 mmφ, area 19.6 $mm^2$). Later, the composition for forming gas diffusion electrode was spread on the entire surface of the rotating disk electrode to form a uniform and given thickness, thereby forming on the surface of the rotating disk electrode a coating film made of the composition for forming gas diffusion electrode. The coating film made of the composition for forming gas diffusion electrode was dried under a temperature of 23° C. and a humidity of 50% RH for 2.5 hours, thus forming the electrode catalyst layer X on the surface of the rotating disk electrode 40.

Measurements by the rotating disk electrode method include performing cleaning inside the rotating disk electrode measuring device; an evaluation of electrochemical surface area (ECSA) prior to the measurement; an evaluation of electrochemical surface (ECSA) before and after an oxygen reduction (ORR) current measurement.

In the rotating disk electrode measuring device D, after soaking the rotating disk electrode 40 in $HClO_4$ electrolyte solution 60, the electrolyte solution 60 was purged with an argon gas for not shorter than 30 min. Then, potential scan was performed for 20 cycles under the condition where the scanning potential was set to be 85~1,085 mV vsRHE, and the scanning speed was set to be 50 mv/sec.

Then, potential scan was performed for three cycles under the condition where the scanning potential was set to be 50~1,085 mV vsRHE, and the scanning speed was set to be 20 mV/sec.

After purging the electrolyte solution 60 with an oxygen gas for not shorter than 15 minutes, a cyclic voltammogram (CV) measurement was performed for 10 cycles under the condition where the scanning potential was set to be 135 to 1,085 mV vsRHE, the scanning speed was set to be 10 mV/sec, and the rotation speed of the rotating disk electrode 40 was set to be 1,600 rpm. An electrical current value at a potential of 900 mV vsRHE was recorded. In addition, the rotation speed of the rotating disk electrode 40 was individually set to be 400 rpm, 625 rpm, 900 rpm, 1,225 rpm, 2,025 rpm, 2,500 rpm and 3,025 rpm, and an oxygen reduction (ORR) current measurement was carried out per each cycle. A current measurement value was defined as an oxygen reduction current value (i).

Finally, the cyclic voltammogram (CV) measurement was performed for three cycles under the condition where the scanning potential was set to be 50 to 1,085 mV vsRHE, and the scanning speed was set to be 20 mV/sec.

The catalytic activity of the electrode catalyst was calculated using a correction formula of mass transfer which is based on a Nernst diffusion-layer model as shown by the following general formula (2), with the aid of the oxygen reduction current value (i) obtained above and a limiting current value (iL) measured in the cyclic voltammogram (CV) measurement. The calculation results of the working examples 1 to 17 are shown in Table 1, and the calculation results of the working examples 18 to 23 are shown in Table 2. In addition, Table 3 shows the calculation results of the comparative examples 1 to 7.

$$ik = \frac{iL \times i}{iL - i} \quad (2)$$

(In the general formula (2), i represents the oxygen reduction current (ORR current) measurement value, iL represents the limiting diffusion current measurement value, ik represents the catalytic activity.)

TABLE 1

| Working example | Pt/% by mass | Pd/% by mass | Bromine species concentration/ ppm | Chlorine species concentration/ ppm | ik/mA |
|---|---|---|---|---|---|
| 1 | 19.3 | 24.1 | 200 | 6100 | 1.96 |
| 2 | 23.8 | 21.9 | 200 | 8400 | 1.90 |
| 3 | 20.5 | 24.4 | 100 | 7400 | 2.25 |
| 4 | 23.5 | 22.4 | 100 | 7500 | 2.64 |
| 5 | 23.7 | 22.0 | 100 | 7600 | 2.75 |
| 6 | 19.5 | 24.2 | 100 | 6100 | 2.41 |
| 7 | 23.5 | 21.5 | 300 | 7800 | 1.97 |
| 8 | 20.6 | 23.7 | 100 | 6000 | 2.32 |
| 9 | 20.4 | 23.2 | 100 | 6100 | 1.91 |
| 10 | 24.3 | 21.1 | 100 | 8500 | 2.07 |
| 11 | 21.4 | 22.0 | 200 | 6100 | 2.51 |
| 12 | 22.9 | 22.5 | 100 | 5700 | 2.47 |
| 13 | 20.6 | 23.7 | 100 | 5200 | 2.45 |
| 14 | 22.9 | 21.8 | 100 | 6600 | 2.03 |
| 15 | 23.7 | 22.0 | 300 | 6100 | 1.68 |
| 16 | 24.3 | 21.2 | 100 | 8500 | 2.11 |
| 17 | 19.5 | 24.2 | 100 | 6000 | 2.32 |

TABLE 2

| Working example | Pt/% by mass | Pd/% by mass | Bromine species concentration/ ppm | Chlorine species concentration/ ppm | ik/mA |
|---|---|---|---|---|---|
| 18 | 21.0 | 23.0 | 100 | 2200 | 1.72 |
| 19 | 22.8 | 22.7 | 100 | 0 | 1.99 |
| 20 | 19.6 | 24.4 | 100 | 0 | 2.16 |
| 21 | 20.0 | 23.5 | 100 | 0 | 2.13 |

TABLE 2-continued

| Working example | Pt/% by mass | Pd/% by mass | Bromine species concentration/ ppm | Chlorine species concentration/ ppm | ik/mA |
|---|---|---|---|---|---|
| 22 | 21.0 | 22.9 | 500 | 0 | 1.74 |
| 23 | 23.5 | 21.5 | 100 | 900 | 2.20 |

TABLE 3

| Comparative example | Pt/% by mass | Pd/% by mass | Bromine species concentration/ ppm | Chlorine species concentration/ ppm | ik/mA |
|---|---|---|---|---|---|
| 1 | 20.9 | 22.5 | 3000 | 6900 | 1.40 |
| 2 | 18.5 | 24.4 | 4100 | 3900 | 1.25 |
| 3 | 21.3 | 22.8 | 6800 | 5600 | 1.65 |
| 4 | 21.9 | 22.9 | 6600 | 5200 | 1.46 |
| 5 | 22 | 22.4 | 8700 | 8900 | 1.20 |
| 6 | 21.9 | 22.8 | 7000 | 6100 | 1.64 |
| 7 | 20.9 | 22.5 | 3900 | 1900 | 1.40 |

According to Table 1 and Table 2, it can be understood that even when containing a chlorine (Cl) species of a high concentration, the electrode catalyst containing a finely controlled amount of bromine (Br) species was able to exhibit a favorable catalytic activity.

Especially, each of the electrode catalysts shown in Table 1 exhibits a chlorine (Cl) concentration greater than 5,000 ppm. However, since these electrode catalysts have their bromine (Br) species concentrations controlled to 100 to 300 ppm, favorable catalytic activities are exhibited.

Meanwhile, according to Table 3, it can be understood that the electrode catalysts whose bromine (Br) species concentrations were greater than 500 ppm exhibited decreased catalytic activities. That is, it became clear that even when containing a chlorine (Cl) species of a high concentration (e.g. greater than 5,000 ppm), an electrode catalyst containing a finely controlled amount of bromine (Br) species is able to exhibit a significantly favorable catalytic activity, and is also suitable for mass production and reducing a production cost.

The electrode catalyst of the present invention is a type of catalyst capable of demonstrating a sufficient catalytic performance even when having a chlorine content of a high concentration. The catalyst electrode is also able to simplify a production process thereof, and is thus suitable for reducing a production cost and conducting mass production. For these reasons, the present invention is a type of electrode catalyst that can be used not only in fuel-cell vehicles and electrical equipment industries such as those related to cellular mobiles, but also in Ene farms, cogeneration systems or the like. Thus, the electrode catalyst of the present invention shall make contributions to the energy industries and developments related to environmental technologies.

The invention claimed is:

1. An electrode catalyst having a core-shell structure comprising:
   a support;
   a core part formed on said support; and
   a shell part formed to cover at least a part of a surface of said core part,
   wherein a concentration of bromine (Br) species of the electrode catalyst is not higher than 500 ppm when measured by X-ray fluorescence (XRF) spectroscopy, and a concentration of chlorine (Cl) species of the electrode catalyst is greater than 5,000 ppm and not higher than 8,500 ppm when measured by X-ray fluorescence (XRF) spectroscopy, and
   wherein said shell part contains at least one metal selected from platinum (Pt) and a platinum (Pt) alloy, and said core part contains at least one metal selected from the group consisting of palladium (Pd), a palladium (Pd) alloy, a platinum (Pt) alloy, gold (Au), nickel (Ni) and a nickel (Ni) alloy.

2. The electrode catalyst according to claim 1, wherein said support contains an electrically conductive carbon, said shell part contains platinum (Pt) and said core part contains palladium (Pd).

3. An electrode catalyst having a core-shell structure comprising:
   a support;
   a core part formed on said support; and
   a shell part formed to cover at least a part of a surface of said core part, said shell part having a two-layered structure composed of a first shell part formed to cover at least a part of said surface of said core part and a second shell part formed to cover at least a part of a surface of said first shell part,
   wherein a concentration of bromine (Br) species of the electrode catalyst is not higher than 500 ppm when measured by X-ray fluorescence (XRF) spectroscopy, and a concentration of chlorine (Cl) species of the electrode catalyst is greater than 5,000 ppm and not higher than 8,500 ppm when measured by X-ray fluorescence (XRF) spectroscopy, and
   wherein said core part contains at least one metal other than a noble metal as a main component(s), said first shell part contains at least one of palladium (Pd), a palladium (Pd) alloy, a platinum (Pt) alloy, gold (Au), nickel (Ni) and a nickel (Ni) alloy, and said second shell part contains at least one of platinum (Pt) and a platinum (Pt) alloy.

4. The electrode catalyst according to claim 3, wherein said first shell part contains palladium (Pd), and said second shell part contains platinum (Pt).

5. A composition for forming a gas diffusion electrode, containing the electrode catalyst as set forth in claim 1.

6. A composition for forming a gas diffusion electrode, containing the electrode catalyst as set forth in claim 2.

7. A composition for forming a gas diffusion electrode, containing the electrode catalyst as set forth in claim 3.

8. A composition for forming a gas diffusion electrode, containing the electrode catalyst as set forth in claim 4.

9. A gas diffusion electrode containing the electrode catalyst as set forth in claim 1.

10. A gas diffusion electrode containing the electrode catalyst as set forth in claim 2.

11. A gas diffusion electrode containing the electrode catalyst as set forth in claim 3.

12. A gas diffusion electrode containing the electrode catalyst as set forth in claim 4.

13. A membrane-electrode assembly (MEA) including the gas diffusion electrode as set forth in claim 9.

14. A membrane-electrode assembly (MEA) including the gas diffusion electrode as set forth in claim 10.

15. A membrane-electrode assembly (MEA) including the gas diffusion electrode as set forth in claim 11.

16. A membrane-electrode assembly (MEA) including the gas diffusion electrode as set forth in claim 12.

17. A fuel cell stack including the membrane-electrode assembly (MEA) as set forth in claim 13.

18. A fuel cell stack including the membrane-electrode assembly (MEA) as set forth in claim 14.

19. A fuel cell stack including the membrane-electrode assembly (MEA) as set forth in claim 15.

20. A fuel cell stack including the membrane-electrode assembly (MEA) as set forth in claim 16.

* * * * *